UNITED STATES PATENT OFFICE.

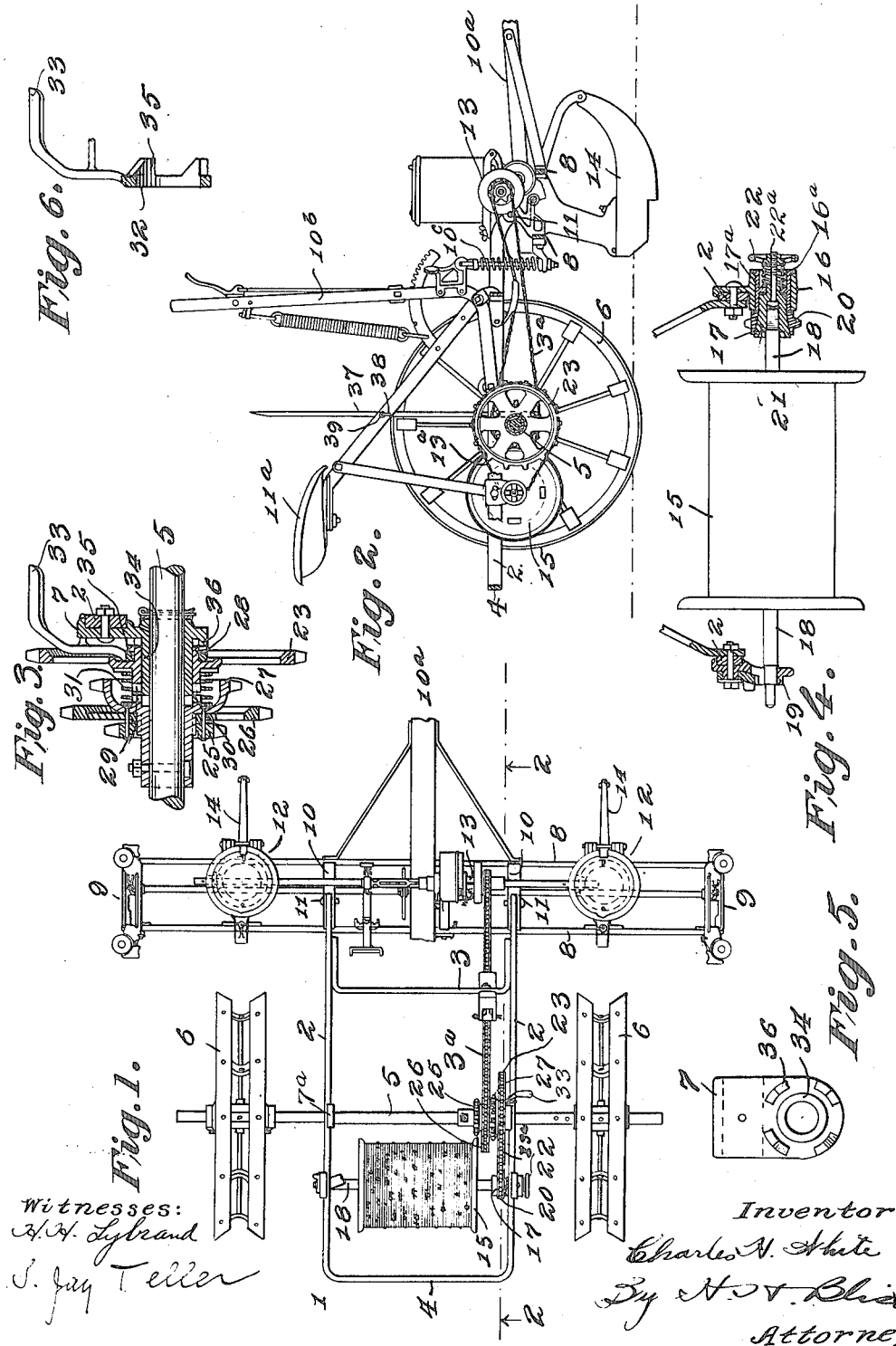

CHARLES H. WHITE, OF MOLINE, ILLINOIS, ASSIGNOR TO DEERE & MANSUR COMPANY, OF MOLINE, ILLINOIS, A CORPORATION OF ILLINOIS.

PLANTING MECHANISM.

1,187,877.

Specification of Letters Patent. Patented June 20, 1916.

Application filed August 6, 1913. Serial No. 783,442.

*To all whom it may concern:*

Be it known that I, CHARLES H. WHITE, a citizen of the United States, residing at Moline, in the county of Rock Island and State of Illinois, have invented certain new and useful Improvements in Planting Mechanisms, of which the following is a specification, reference being had therein to the accompanying drawing.
This invention relates to improvements in planters of the check row type, the object being to provide an improved mechanism for winding and unwinding the check row wire, together with improved devices for supporting and operating it.

Figure 1 is a plan view of a machine showing the reel supporting and operating parts, and their relations to the rest of the mechanism. Fig. 2 is a side view, partly in elevation and partly in section, along the line 2—2 of Fig. 1. Fig. 3 is a fragmentary sectional view of the driving mechanism for the reel. Fig. 4 is a rear view of the reel and a vertical section of parts taken on the axis of the reel. Fig. 5 is an elevation of one of the axle bearing brackets. Fig. 6 shows the device for throwing the reel into and out of operation.

1 represents the main frame of a planting mechanism, to which the parts can be applied which more particularly embody the present invention. It has two side bars 2, 2, the front cross bar 3, and the rear cross bar 4. Preferably, the side bars 2, 2, and the rear cross bar 4 are formed integrally, as shown.

5 is the main supporting and driving axle, and 6, 6, are the supporting and covering wheels. One is secured to the axle, and the other is journaled thereon. The main frame is mounted on the axle by bearing brackets 7, 7ª, secured to bars 2.

The front frame of the planter comprises the two parallel transverse bars 8, 8, connected by the check-heads 9, 9, and bracket castings 10, 10. The side bars 2, 2 of the rear frame are connected to the front frame by pivots at 11, 11, mounted in castings 10, 10.
10ª is the tongue, rigidly secured to the front frame.

10ᵇ is a lever pivotally mounted on the front part of the main frame. It is provided with a handle, a detent and thumblatch, the detent engaging with a toothed segment on the frame.

11ª is the seat for the driver.

At 10ᶜ there is a resilient connecting mechanism between the lever and the front frame, this comprising a link and a coil spring surrounding it.

The front frame 8, 9, 10 carries the seed delivering mechanisms at 12, the seeder actuating mechanism at 13, (such as a clutch and adjuncts of any well known type) and the furrow openers 14. The seeder actuating mechanism is driven from the main axle 5 by the chain 3ª. The latter engages with one or another of the sprocket wheels 25, 26, 27, rigidly secured to the axle.

The parts above referred to constitute the principal elements of a well known form of planter mechanism.

15 is a reel for the check row wire. This reel is provided with trunnions 18 which are made square at their ends. Secured to one of the side bars 2 of the main frame is a bracket 16 in which there is mounted a rotatable socket 17 adapted to receive the squared end of one of the trunnions on the reel. The other side bar 2 is provided with a hook bearing 19 for receiving the other trunnion of the reel, and a swinging lock piece for holding the trunnion in place when in the bearing.

20 is a sprocket wheel on the axis of the reel. It has a tapering bore or central aperture. The socket piece 17 is conical or tapered at its inner end, as shown at 21, this part being fitted in the tapered bore or central aperture of the sprocket wheel. The socket piece 17 extends outward somewhat beyond the sprocket wheel, the extension part fitting in the sleeve 17ª in the tubular part of the bearing bracket 16.

22 is a hand wheel engaging with a headed, threaded rod 22ª. The head of this rod engages with the inner side of the outer end of the socket piece 17.

16ª is a spring abutting against a flange on the sleeve 17ª and bearing against the hand-wheel 22ª. By means of these parts the reel and the driving sprocket wheel 20 can be secured together more or less rigidly.

23 is a relatively large sprocket wheel, mounted on and concentrically with the main axle and loose in relation thereto, so that it can both rotate freely and move bodily, axially. Preferably, it is mounted on the tubular part of the bearing bracket 7. The hub of this wheel 23 has clutch teeth at 29 which are adapted to engage with counterpart clutch teeth 30 on the hub part of the sprocket wheel system 25, 26, 27.

31 is a coiled spring interposed between the hub part of the wheel 23 and the hub part of the said sprocket system, which normally tends to hold the wheel 23 out of engagement with the teeth 30.

32 is a ring or sleeve mounted loosely on the tubular extension 34 of the hub of wheel 23. This ring has cam lugs 35 adapted to engage with counterpart lugs 36 on the bracket bearing 34. When the ring or sleeve 32 is rocked in one direction, the cam lugs 35 and 36 cause the wheel 23 to move inward, and bring the teeth 30 into engagement, whereupon the wheel 23 is put in rotation, and the reel, in turn, is rotated by the chain 13ª and wheel 20. As soon as the lever 33 is released, the spring 31 throws the wheel 23 out of engagement with the axle and the reel stops rotating.

37 represents one of the anchors with which the planting mechanism is provided for the purpose of holding the check wire at its ends. It is provided with a hook 38 adapted to enter an aperture 39 in the seat supporting bar. This anchor rod when so suspended can have its lowest end vibrated transversely of the machine.

The operation of the reel apparatus, above described, will be readily understood.

When the machine is brought in the field the reel is in position as set forth; one of the anchors is set at the proper point and the planter is drawn away from it. As the machine moves across the field the reel unwinds under the tension of the wire fastened to the anchor. At such time the wheel 23 and the chain 13ª are idle. It is desirable to pay out the wire under regulated tension in order to have a predetermined tautness on the part that is stretched across the field. Unless these results are obtained, there is danger of the rows not being properly checked. The friction control devices at 21, 22 enable me to secure the desired tension which is determined upon as necessary under a given circumstance.

The reel can be readily detached at any time without requiring the dismounting of all of its supporting and driving parts. The latter, as will be seen, are all within the side parts of the main frame, the driving chain 13ª, the wheels 20 and 23, and the rotary bearing socket 17, all being inside of the right hand frame bar which supports one end of the reel; and at the same time the regulating device at 22 is outside of the frame and readily accessible.

When the check wire is to be again wound upon the reel after the planting has been finished, the machine is moved forward over the wire lying upon the ground. The operator presses his foot against the pedal of the lever 33 and causes the wheel 23 to be connected with the axle, as described. The reel is then rotated in such direction as to wind the wire. To cause it to form uniform spiral coils the operator grasps the upper end of the anchor rod with his hand and vibrates the lower end in such way as to cause the wire to wrap spirally back and forth as the reel rotates. The winding up of the reel is also done more advantageously by having combined with it means for varying the tension on the wire as it is wound, and such regulation of tension can be effected by the devices at 21, 22, above described.

It is desirable that the reel driving mechanism should be stationary after the wire has been laid and the machine is being used for planting; the general practice being to detach the reel from its mountings and set it outside during the planting. It is mounted in relatively low planes and below the framework for that purpose. In earlier mechanisms designed to carry the reel permanently in position the reel driving mechanism has been permanently connected with the seeder driving mechanism either directly or through the axle or some continuously moving part. In my machine the reel driver is, from its initial power-receiving wheel, normally stationary, and including the chain and the driven sprocket.

By having the reel driving mechanism, the wheel 23, the chain 13ª, and the wheel 20 between the side bar element of the main frame and the reel I am enabled to effect intermitting and optional connection of the main driving wheel 13, with the seeder driving mechanism in a simple manner and by cheaply constructed devices. I prefer to cast the inter-engaging parts (the teeth at 29 and 30), one on the axially sliding power receiving wheel 23 and the other on one part or another of the series of speed varying wheels which drive the seeder mechanism, and to mount all of these wheels (23, 25, 26 and 27) on the main power shaft, which in this case is the axle 5. But, of course, there can be modifications in respect to these details without materially increasing the cost of the mechanism or making it materially complex.

By having the wheel 20 on the inside of the side bar element of the frame and the hand wheel 22 on the outside they abut oppositely on the frame when the conical socket bearing 17 is drawn outward more or less tightly; and, as above described, the wheel 20 being part of the train of reel-driving devices and arranged inside of the side bar element of the frame, these driving devices can be readily connected to the main power parts.

What I claim is:

1. In a corn planter, the combination of the main frame, a supplemental frame, seeding mechanism on the supplemental frame, power devices on the main frame for actuating the seeding mechanism comprising a rotating shaft and a gear wheel thereon, supporting devices on the main frame adapted to support a rotatable check wire reel, a reel driving mechanism comprising a sprocket wheel on said shaft, a sprocket wheel on the reel, a chain for connecting said sprocket wheels, and means for optionally connecting the chain driving wheel directly with the seeder driving wheel independently of the shaft, whereby the chain can be bodily stopped or started.

2. In a corn planter, the combination of a main frame, a supplemental frame pivotally connected with the main frame, supporting devices on the main frame, adapted to support a rotatable check-wire reel, a continuously rotating axle, a normally stationary reel driving mechanism comprising an element mounted on the axle, means for optionally guiding the check-wire as it is reeled upon or off from the reel, and means adapted to be actuated by the operator's foot and operable irrespectively of the relative positions of the two frames for throwing said reel driving mechanism into and out of connection with the axle.

3. In a corn planter, the combination of a main frame, a supplemental frame pivotally connected with the main frame supporting devices on the main frame adapted to support a check-wire reel, a continuously acting power mechanism, a normally inactive reel driving mechanism having a power receiving wheel movable bodily along its axis to engage it with or disengage it from the power mechanism, and means adapted to be actuated by the operator's foot and operable irrespectively of the relative positions of the two frames for moving the said reel driving wheel axially into and out of operative position.

4. In a corn planter, the combination of a main frame having at each side a longitudinally disposed bar element, a supplemental frame pivotally connected with the main frame, a rotatable shaft connected with the main frame and extending from one of said bar elements to the other, continuously rotating power devices on said shaft and situated between the side bar elements, supporting devices on said frame to support a check-wire reel, a reel driving mechanism having an axially movable power receiving wheel between the said power devices and one of the said side bar elements, and means operable irrespectively of the relative positions of the two frames for optionally moving the said power receiving wheel axially into and out of connection with the power devices.

5. In a corn planter, the combination of a main frame, a supplemental frame, seeder mechanism on said supplemental frame, a rotary power shaft on the main frame, driving devices on said power shaft including a clutch element, a seeder driving mechanism engaging the said driving devices, supporting devices on the main frame adapted to support a rotatable check-wire reel, a reel driving mechanism comprising a power receiving wheel on the said shaft and a clutch element, and means accessible to the foot of the operator while in his seat and operable while the seeder driving mechanism is in continuous operation for optionally bringing the said two clutch elements into engagement to actuate the reel.

6. In a corn planter, the combination of a main frame, a supplemental frame, seeding mechanism on the supplemental frame, power devices on the main frame comprising a series of speed varying gear wheels for actuating the seeding mechanism, and a clutch element, supporting devices adapted to support a rotatable check-wire reel, a reel driving mechanism comprising a power receiving gear wheel and a clutch element adjacent the aforesaid wheels and clutch element, and means for optionally connecting the second clutch element and the power receiving wheel of the reel driving mechanism with the first clutch element.

7. In a corn planter, the combination of a main frame, having at each side a longitudinal side bar element, a supplemental frame, a seeding mechanism on the supplemental frame, and devices for actuating the seeding mechanism comprising a rotating shaft and one or more wheels connected thereto in longitudinal vertical planes between the side bar elements of the main frame, supporting devices adapted to support a rotatable check-wire reel, a reel-driving mechanism having a power receiving wheel between the side bar elements of the main frame, and means for optionally connecting the last said wheel directly to one of the wheels of the seeder driving mechanism independently of the shaft thereof.

8. In a corn planter, the combination of a main frame, a supplemental frame, seeder mechanism on the supplemental frame, a rotary power shaft on the main frame, seeder driving devices on said power shaft, a stationary support for said shaft on the main frame, supporting devices for a rotatable check-wire reel, a reel driving mechanism having a power receiving wheel mounted directly on the said shaft support, and means for optionally connecting the said power receiving wheel with the power shaft.

9. In a corn planter, the combination of a main frame, supporting devices thereon for supporting a rotatable check-wire reel, a reel-rotating wheel loosely mounted adjacent to one of the said supporting devices and abutting outward against the frame, means abutting inwardly against the frame for varying the force transmitted from the wheel to the reel, and power mechanism adapted to be optionally connected to the said wheel.

In testimony whereof, I affix my signature, in presence of two witnesses.

CHARLES H. WHITE.

Witnesses:
BAILEY W. AVERY,
JOHN W. DAY.